Oct. 27, 1970  O. L. LOOKER  3,535,857
FEED MECHANISM FOR CORNSTALK EJECTOR
Filed Aug. 5, 1968  6 Sheets-Sheet 2

INVENTOR.
OLIN L. LOOKER
BY J. W. Anderson
C. E. Tripp
ATTORNEYS

Oct. 27, 1970   O. L. LOOKER   3,535,857
FEED MECHANISM FOR CORNSTALK EJECTOR
Filed Aug. 5, 1968   6 Sheets-Sheet 3

FIG_5

INVENTOR.
OLIN L. LOOKER
BY F. W. Anderson
C. E. Tripp
ATTORNEYS

Oct. 27, 1970  O. L. LOOKER  3,535,857

FEED MECHANISM FOR CORNSTALK EJECTOR

Filed Aug. 5, 1968  6 Sheets-Sheet 6

INVENTOR.
OLIN L LOOKER
BY F. W. Anderson
C. E. Tripp
ATTORNEYS

//  # United States Patent Office 3,535,857
Patented Oct. 27, 1970

3,535,857
FEED MECHANISM FOR CORNSTALK EJECTOR
Olin L. Looker, Milford, Ill., assignor to FMC Corporation, San Jose, Calif., a corporation of Delaware
Filed Aug. 5, 1968, Ser. No. 750,223
Int. Cl. A01d 45/02
U.S. Cl. 56—18                                    6 Claims

ABSTRACT OF THE DISCLOSURE

A pair of feed chains have confronting flights underlying and converging toward interdigitating rotors which are arranged to straddle an upright cornstalk. A pair of endless gathering belts for gripping the cornstalks are mounted beneath the feed chains and ejection rotors. A special speed relation between the gathering belts and the feed chains bends the upper portions of broken cornstalks into proper feeding position for gripping and ejection by the ejection rotors.

CROSS REFERENCES TO RELATED APPLICATIONS

The present disclosure includes the corn harvesting mechanism disclosed in my pending patent application Ser. No. 675,467, now Pat. No. 3,399,272, which is assigned to the same assignee as the present invention.

BACKGROUND OF THE INVENTION

The present invention is directed to mobile harvesting machines, and more particularly to corn harvesting machines having stalk guide and conveying means such as a gathering belt or chain run at each side of the row of cornstalks, a slotted plate or similar stop to arrest the ears between the lower portions of the confronting flights of the gathering belt, and snapping rolls or knife blade rotors beneath the stripper plate for pulling the cornstalks downward through the slotted stripper plate. The stripper plate arrests the ears on the cornstalk so that the stalks are either pulled from the ears by the snapping rolls, or the stems of the ears are severed by the knife blade rotors.

A prior art harvesting machine of the general type mentioned above is shown, for example, in the patent of Schaaf et al., 2,716,321. The harvesting mechanism in Aaslund 2,480,209 provides gathering chains having adjacent runs with interdigitating fingers which both guide the stalk and form a stop to arrest the ears as the stalk is pulled down by a pair of subposed snapping rolls.

SUMMARY OF THE INVENTION

In my aforementioned patent, the corn picking heads and their knife blade rotors decline toward the cornstalks. The rotors straddle the lower portions of the cornstalks and pull the stalks downward onto the ground during the ear harvesting operation. The resulting forces imparted to a cornstalk tend to bend the upper portion of the stalk forwardly away from the harvesting machine. If the stalk should break off above the knife blade rotors while the ears are harvested, the upper portion of the broken stalk is inclined forward and is moved rearward in the picking head for upward ejection by the interdigitating paddle blades of a pair of stalk ejecting rotors. Because the broken stalk portion is inclined, it is in approximate parallelism with the leading edges of the paddle blades. Due to this condition, gripping of the stalk is inhibited by the edges of the rotating paddle blades.

In some cases effective gripping of the broken stalk is prevented, with the result that the broken stalk remains in the harvesting machine with the ears. In order to assure positive gripping and ejection of all broken stalks, the present invention provides a pair of feed chains, with gripping lugs, that are driven rearwardly slower than the gathering belts. In this manner, the upper portion of the already forwardly bent stalk is retarded by the lugs and additionally bent forwardly so that it is in marked angular relation to the leading edges of the interdigitating paddle blades of the stalk ejecting rotors. By this arrangement all stalks are positively gripped, since only the lower sectors of the ejecting rotors initially contact the stalks, and because the edges of the paddle blades of the rotors cannot block free entry of the stalks.

DESCRIPTION OF THE PREFERRED EMBODIMENT

The harvesting machine 20 (FIG. 1) includes a frame 21 supported by steerable rear wheels 22 and driven by powered front wheels 23. A driver at a control station 24 manipulates controls at a console 25 which govern various hydraulically powered mechanisms driven by an engine in a housing A. A V-belt and pulley unit 32 is connected to the engine and to a jackshaft 33. Extending across the harvesting machine, the jackshaft transmits power by a V-belt 36 to a centrifugal blower B. Continuous air blasts from the blower B separate leaves and other debris from the ears and deposit the debris onto the ground.

Figure 7:
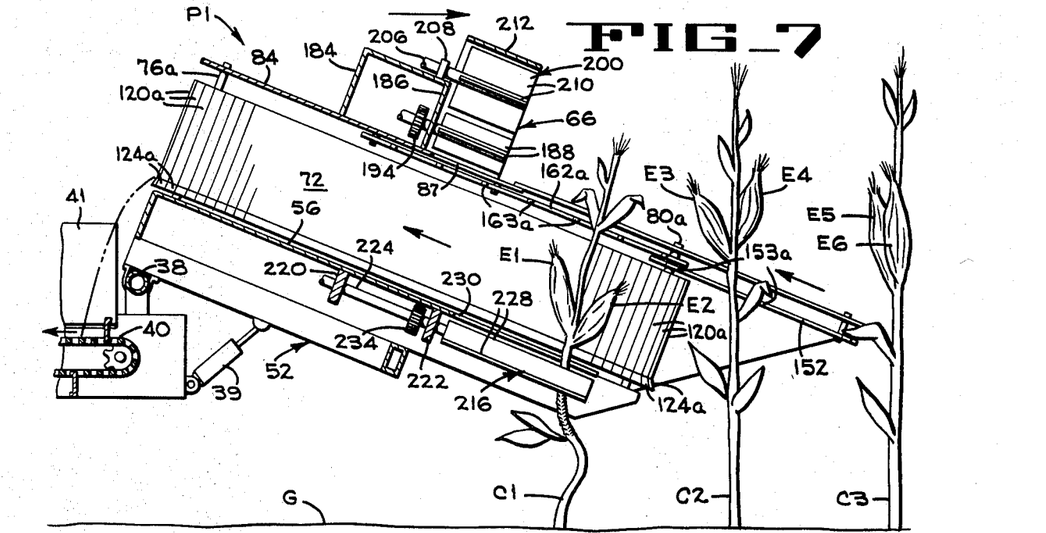
FIGS. 7–9 are diagrammatic operational elevations illustrating the harvesting action of the picking head shown in FIG. 2.

Mounted on the leading end of the harvesting machine 20 (FIG. 1) are laterally spaced picking heads P1 and P2, each head being arranged to straddle a row of cornstalks C (FIG. 7). The picking heads are interconnected near a common horizontal pivot shaft 38, and can be pivoted upward and held in a selected position by energizing a double-acting hydraulic cylinder 39 and an identical cylinder, not shown, at the other side of the machine.

Figure 1:
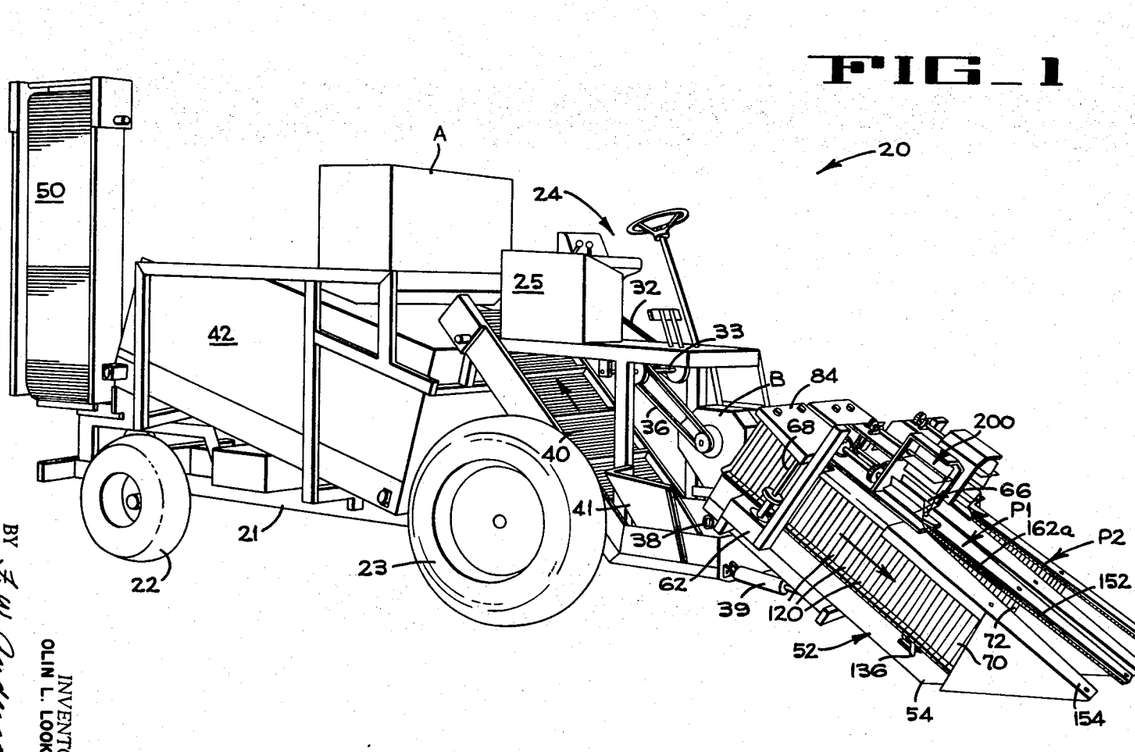
FIG. 1 is a perspective of the corn harvesting machine with its leading end picking heads and a trailing and discharge conveyor in non-operative parking or rest positions.

The picking heads are shown resting on the ground G in a non-operating or parking position in FIG. 1. For transporting the machine to and from a cornfield and for a harvesting operation, the picking heads are elevated from the FIG. 1 position. The subject matter of the present invention is embodied in each of the picking heads P1 and P2, as will be later described in detail.

Continuing with the general description of the harvesting machine 20, the picking heads P1 and P2 function to pull the stalks downward onto the ground, while the ears are severed from the stalks and conveyed rearwardly within the picking head. Each picking head discharges the harvested ears onto the level inlet end of an elevator conveyor 40. An outwardly tilted guide panel 41 at each side of the elevator conveyor guides the ears onto the conveyor, and the air blasts from the blower B impinge the guide panels 41 to blow loose foliage and all other material lighter than the ears over the panels onto the ground.

Extending a short distance rearwardly, and then upwardly under the control station 24, the elevator conveyor 40 discharges the ears into a hopper 42. The ears are conveyed from the hopper to subsequently be fed onto an elevator conveyor 50, here illustrated in its upright position that is used when the harvesting machine is moved to and from the cornfield. In a harvesting operation, the elevator conveyor 50 is inclined so as to discharge the ears into a truck or wagon moving along with the harvesting machine.

With more detailed reference to the structure of the picking heads P1 and P2 of the present invention, the two units include similar parts with minor and obvious differences in orientation. For this reason, only the picking head P1 is herein described in detail.

The picking head P1 is provided with a fabricated frame 52 (FIG. 5) which includes an elongate base member 54, of inverted channel shape, having a top wall 56. Mounted under the wall 56 is a variable speed hydraulic motor 58 that is coupled by a chain and sprocket drive connection 60 to the input shaft of a gearbox 62. Two output shafts are provided on the gearbox; a horizontal shaft 64 which drives a stalk ejector mechanism 66, and a vertically extending shaft 68. The shaft 68 carries a sprocket 69 for driving a pair of endless gathering belts 70 and 72 (FIG. 6). The gathering belt 70 is mounted on a pair of drive sprockets 74 keyed to a shaft 76, and a pair of idler sprockets 78 keyed to a shaft 80. Similarly numbered parts in FIG. 5 with the suffix *a* carry the gathering belt 72.

Figure 2:
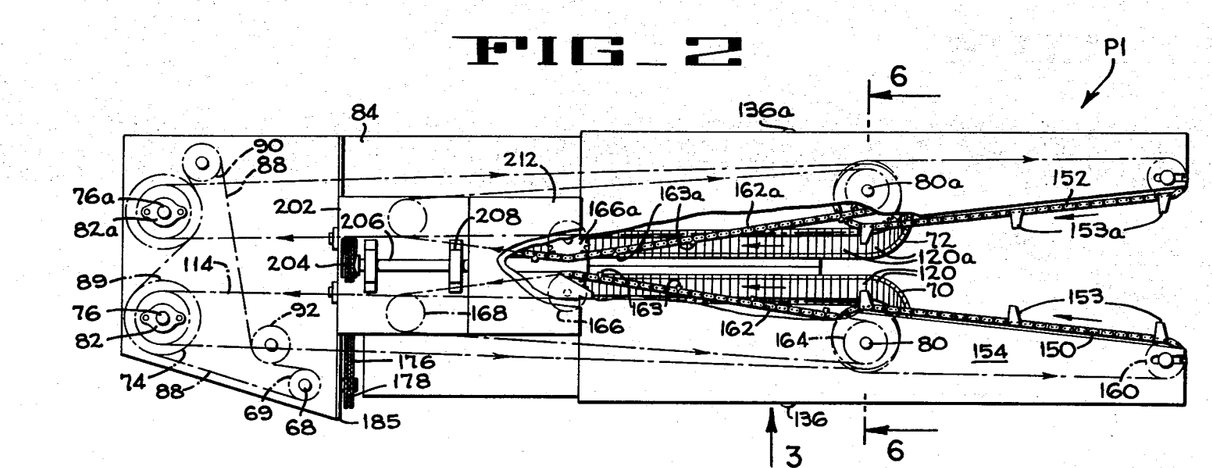
FIG. 2 is a plan of one picking head, partly broken away to show mechanism otherwise concealed.

As best shown in FIG. 2, the drive shafts 76 and 76a extend upward through bearings 82 and 82a that are secured to an elongate stripper plate 84. The stripper plate extends forwardly beyond the stalk ejector 66 and is supported by posts 86 (FIG. 5) from the top wall 56 of the base 54. The stripper plate is provided with a forwardly open central slot 87 which is wide enough to admit a cornstalk. A drive sprocket 89 is secured to the upper end portion of each driveshaft, and a chain 88 is trained around the drive sprockets 69 and 89, and around a pair of idler sprockets 90 and 92, in a manner which rotates the drive sprockets for the gathering belts 70 and 72 in opposite directions.

The idler shaft 80 is mounted in bearings 96 which are each supported by a mounting plate 98 that is welded to a rod 100. Each rod 100 is slidably mounted in a tube 102 that extends through and is welded to a square post 104. As clearly shown in FIG. 6, the post 104 and a similar post 104a for the shaft 80a diverge from the base member 52 with an included angle of about 14 degrees. Nested over the front of the post 104 is a "floating" channel 106 having apertures aligned with the tubes 102, and arranged to be positioned in preselected nested relation to the post by bolts 108 and 110. Bolt 108 is threaded through the upper end portion of the post 104 and bears against the inner surface of the channel 106.

The lower end portion of the channel 106 carries a forwardly and downwardly extending bracket 112, through which the bolt 110 is threaded. The end of the bolt abuts a fixed surface of the frame. As thus described, the channel 106 can be positioned fore and aft relative to the post 104, and contacts the mounting plates 98 to maintain the shaft 80 at a predetermined distance from the post. This distance is adjusted to supply the correct tension to the gathering belt 70. The shaft 80a is provided with a similar belt-tensioning mechanism.

The gathering belt 70 (FIG. 6) includes two endless chains 114 trained around the pairs of sprockets 74 and 78. Each link of the chains is provided with apertured attachment tabs to support an upright metal slat or stop bar 120. The upper end portion of each flight of stop bars is bent over to form an inwardly directed flange 122. The lower end portion of each flight is bent to provide an outwardly declining ledge 124. The stop bar flights 120 (FIG. 2) are laterally aligned with similar stop bar flights 120a of the adjacent reach of the gathering belt 72.

The result of this construction is that the ledges 124 cooperatively form, with the ledges 124a of the stop bars 120a, a rearwardly moving butt stop or shelf which will arrest the ears E. Thus, the gap between the confronting lower edges of the stop bar flights 120 and 120a is less than the diameter of the smallest ear to be harvested. The confronting reaches of the gathering belts 70 and 72 are driven rearward at a linear speed approximately ten percent faster than the ground speed of the machine so as to minimize relative horizontal motion between the ears and the gathering belts, and the gathering belts are spaced apart such that the flights gently grip the ears rearwardly of the upwardly diverging forward end portions of the reaches. By means next described, the gap between the gathering belts can be adjusted to suit the average diameter of the ears to be harvested.

Figure 5:
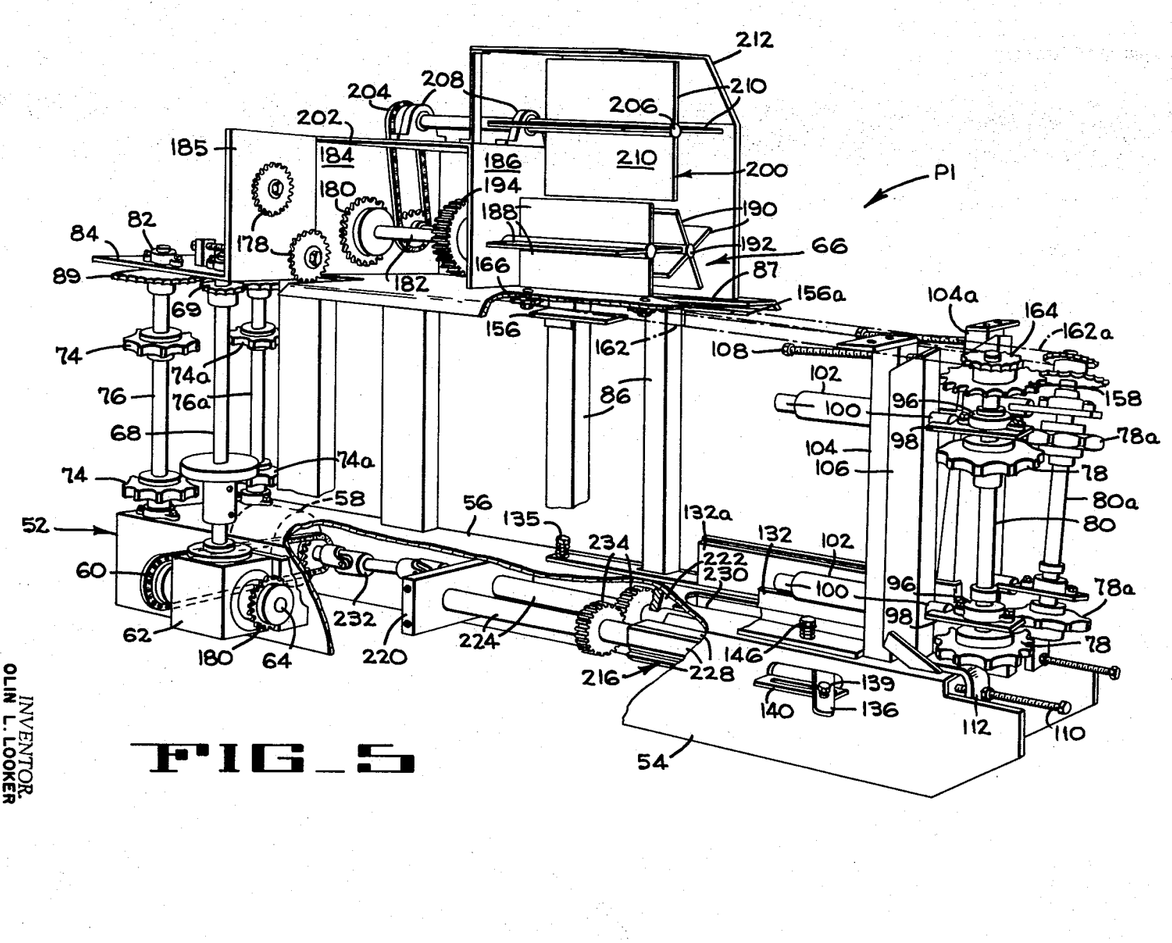
FIG. 5 is an enlarged perspective of the frame of the picking head shown in FIG. 2.
Figure 6:
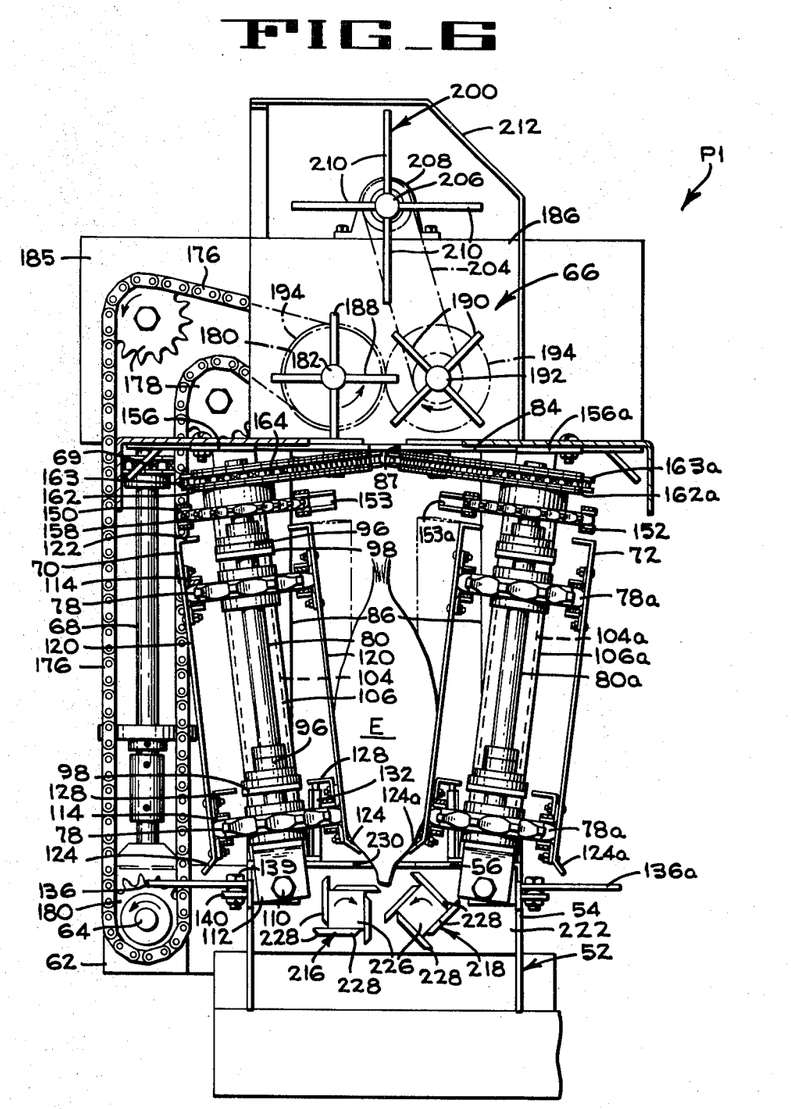
FIG. 6 is an enlarged section along lines 6–6 on FIG. 2.

The manner in which the inner reach of the gathering belt 70 is supported as it moves rearwardly between its drive and idler sprockets, and part of the adjustment mechanism for moving the lower portion of the reach toward or away from the center of the picking head P1 to vary the width of the lower gap between the gathering belts 70 and 72 to suit the size of the corn being harvested is shown in FIGS. 5 and 6. The adjustment mechanism also provides a rigid stop for preventing the lower portions of the stop bars from spreading apart, and thus preserves the adjusted width of the lower gap. At the same time, the upper portion of the stop bars can tilt slightly away from the gap. In this manner, the ears of corn are gripped by the stop bars with some degree of resilience.

An upper attachment tab on the lower chain 114 is provided with an angle clip having an inwardly directed leg 128 arranged to slide along the upper edge of an upright gathering belt support and chain wear bracket 132. The bracket 132 is provided with an upright leg that bears against the upper inner edge of the lower chain 114, thus maintaining the adjacent stop bar flights 120 of the inner reach of the gathering belt 70 linear and coplanar. Further, the support and wear plate bracket is pivotally adjustable toward or away from the longitudinal centerline of the picking head P1 so that the interspacing of the forward portions of the confronting reaches of the gathering belts 70 and 72 can be preset for the average size of the corn to be harvested. As illustrated in FIG. 5 only for the bracket 132a, each bracket is pivoted to the wall 56 by a bolt and compression spring 135.

Figure 3:
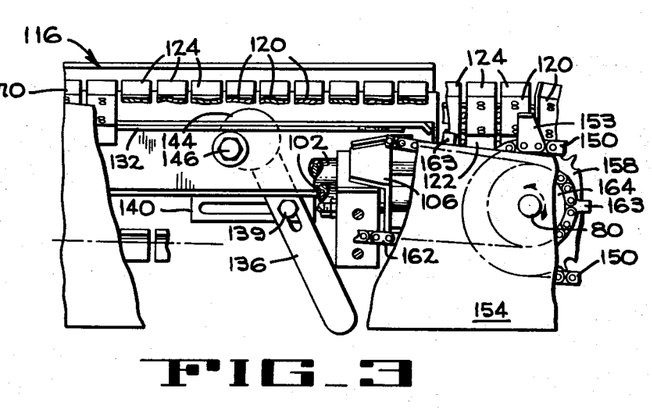
FIG. 3 is an enlarged, fragmentary plan, partly broken away, of the area indicated by the arrow 3 on FIG. 2.

A pivotable lever 136 projects laterally through an elongate aperture in the base member 52 for moving the belt support bracket 132 toward or away from the center of the picking head, thus adjusting the inner reach of the gathering belt 70. A similar lever 136a is provided for adjusting the adjacent reach of the gathering belt 72. The lever 136 overlies a slotted locking plate 140, to which it can be locked by a bolt 139 to maintain a selected adjustment. As shown in FIG. 3, the inner end of the lever 136 is arranged to rotate a circular cam disc 144. The cam disc 144 is rotatable in an aperture provided in the top wall 56 of the base member 54. A bolt 146 and a spring not shown, that is mounted on the bolt maintains gripping tension of the assembled parts with the wall 56.

The leading ends of the gathering belts 70 and 72 (FIGS. 1 and 2) are provided with conventional gathering chains 150 and 152, respectively, having pusher lugs 153 and 153a. The gathering chain 150 is supported by a cantilever arm 154 that is secured to tabs 156 (FIGS. 5 and 6) of the frame 52, and extends forward of the gathering chain idler shaft 80. Chain 150 derives its power by means including a sprocket 158 on the idler shaft 80, and is trained around a resiliently mounted idler sprocket 160.

Intermediate the sprockets 158 and 160, and between similar sprockets for the gathering chain 152, the rearwardly moving inner reaches of two gathering chains 150 and 152 define an outwardly diverging entrance throat for guiding the stalks into the machine while the pusher lugs 153, 153a mounted on the gathering chains drive the stalks rearward relative to the harvesting machine. As thus far described, the structure is the same as disclosed in my previously identified patent. The following description includes the subject matter of the present invention.

Figure 4:
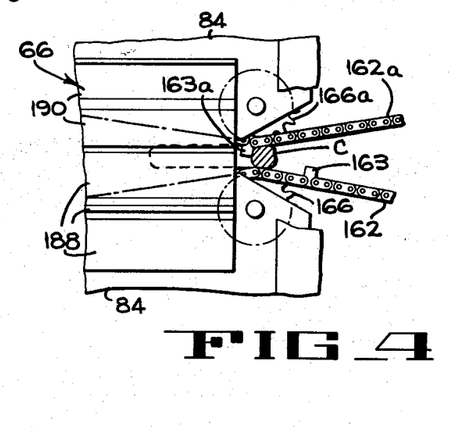
FIG. 4 is an enlarged fragmentary plan illustrating the manner in which broken stalk sections are engaged for feeding into ejection rotors which remove the broken sections from the picking head.

A particular feature of the present invention is in the provision of two ejector feed chains 162 and 162a (FIGS. 2, 4 and 6) having laterally projecting lugs 163 and 163a, and the coaction of these chains with the gathering belts 70 and 72, and with the stalk ejector mechanism 66. The ejector chain 162 is powered by a sprocket 164 that is secured to the idler shaft 80 (FIGS. 2 and 5) and is trained around idler sprockets 166 and 168. The idler sprockets depend from the stripper plate 84, and the idler sprocket 166 and its counterpart sprocket 166a, as shown in FIG. 4, are spaced closely together near the leading edge of the stripper plate so that the confronting chain flights forward of the stripper plate converge to approximately center the stalks.

It is important to note that the gathering belt 70 operates at the same lineal speed as its associated gathering chain 150 because the sprockets 74 and 158 are the same size, but that the ejector feed chain 161 operates at a slower lineal speed that the gathering belt and gathering chain because its drive sprocket 164 is smaller than sprockets 74 and 158. It is therefore clear that when the upper portion of a stalk C (FIG. 4) is engaged with the lugs 163 or 163a, that portion of the stalk is retarded or underfed (relative to rearward movement) from other portions of the stalk. This stalk retarding or underfeeding operation is a basic aspect of the invention to assure ejection of stalks which might break off while being processed, as later described in connection with the operational FIGS. 7–11.

Power is transmitted to the stalk ejector 66 (FIGS. 5 and 6) by a roller chain 176 that is trained around a sprocket 180 on the output shaft 64 of the gear box 62. Chain 176 is trained around a pair of idler sprockets 178, and around a driven sprocket 180. The latter sprocket is mounted on a paddle shaft 182 which extends through spaced upright walls 184, 186 that are secured to the stripper plate 84. Idler sprockets 178 are mounted on an extension 185 of the wall 184.

On its forward end portion, the paddle shaft 182 carries four equiangularly spaced paddle blades 188 which interdigitate with similar paddle blades 190 that are mounted on a paddle shaft 192. The shafts 182 and 192 carry intermeshing gears 194 so that the paddle blades 188 and 190 rotate in opposite directions to move the interdigitating blades upward. The slot 87 in the stripper plate 84 flares outward at its leading end to guide cornstalks between the paddles 188 and 190 if a stalk should break off in the picking unit so that it cannot be harvested in the normal manner. In this event, the ejector feed chains 162 and 162a control the broken stalk and deliver it with a particular orientation into position to be gripped by the stalk ejector paddles and driven upwardly out of the machine.

During ejection of the stalk, the ears are arrested by the stripper plate 84 and are thus separated from the stalk. In order to divert the ejected stalks laterally away from the harvesting machine, a driven deflector paddle 200 (FIGS. 5 and 6) is mounted on a wall 202 that spans the upper portions of the upright walls 184 and 186. The deflector paddle 200 includes a chain and sprocket drive connection 204 to the paddle shaft 192, a shaft 206 rotatable in bearings 208, and four equally spaced paddle blades 210 that are secured to the shaft 206 and lie above the stalk ejector paddles 188 and 190. In cooperation with a sheet metal hood 212 that is open toward the side of the harvesting machine, the deflector paddle 200 forces the broken stalks, feed upward through the stalk ejector 66, laterally onto the ground.

The normal harvesting of ears from unbroken stalks is accomplished by means including conventional counter-rotating knife blade rotors 216 and 218. Lateral journal blocks 220 and 222 rotatably mount a pair of shafts 224 which, forwardly of the block 222, merge into square sections 226. A knife blade 228 is secured to each flat of the square section of each rotor. Above the rotors, the wall 56 of the base member 52 is provided with a forwardly open slot 230 to provide a clearance passage for the cornstalks. The slot 230 is relatively wide so that husks, leaves and other waste foliage have a clear passage into the knife blade rotors for immediate removal from the picking head.

One of the rotor shafts 224 has a drive coupling 232 to the hydraulic motor 58, and the two shafts 224 have intermeshing gears 234 that transfer driving power from the directly driven rotor 218 to the rotor 216. The rotational speed of the rotors is approximately 1200 r.p.m. The knife blades 228 straddle the cornstalk as the harvesting machine 20 is advanced along the row and positively chop into the rapidly drive the stalk downward. Meanwhile, the moving stop bars 120 and 120a above the rotors move rearward slightly faster than the ground speed of the harvesting machine. Consequently, there is very little relative horizontal motion between the ears and the stop bars.

As shown in FIG. 6, when an ear is positioned with its butt-end seated upon the stop bar ledges 124 and 124a, its attachment stem to the stalk is in position to be severed by the rotor knives. Following severing of the harvested ear, it remains supported by the ledges and is carried rearward, gripped by the stop bar assemblies, for discharge onto the elevator conveyor 40 (FIG. 1).

OPERATION

Figure 8:
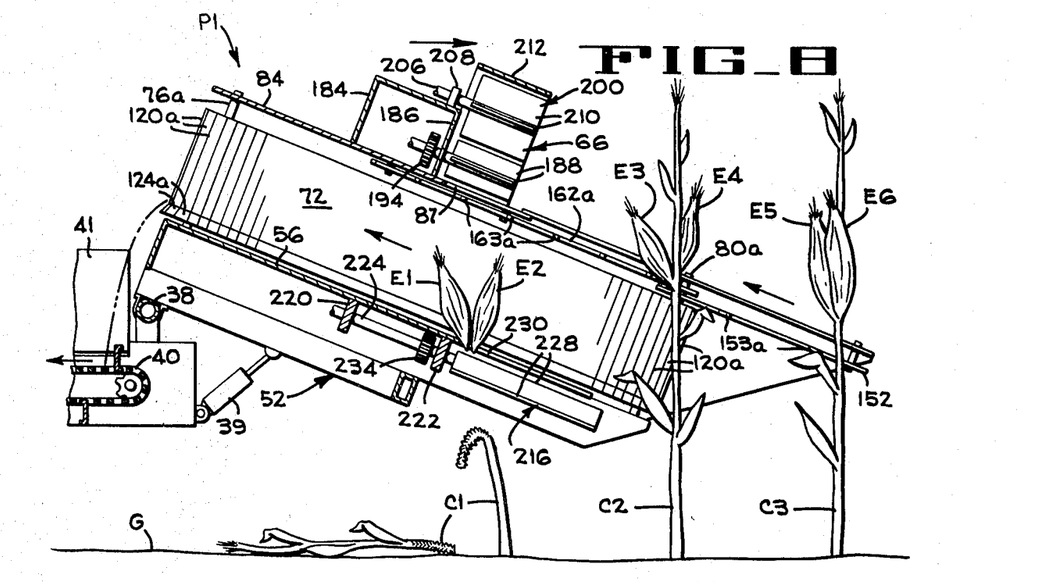
Figure 9:
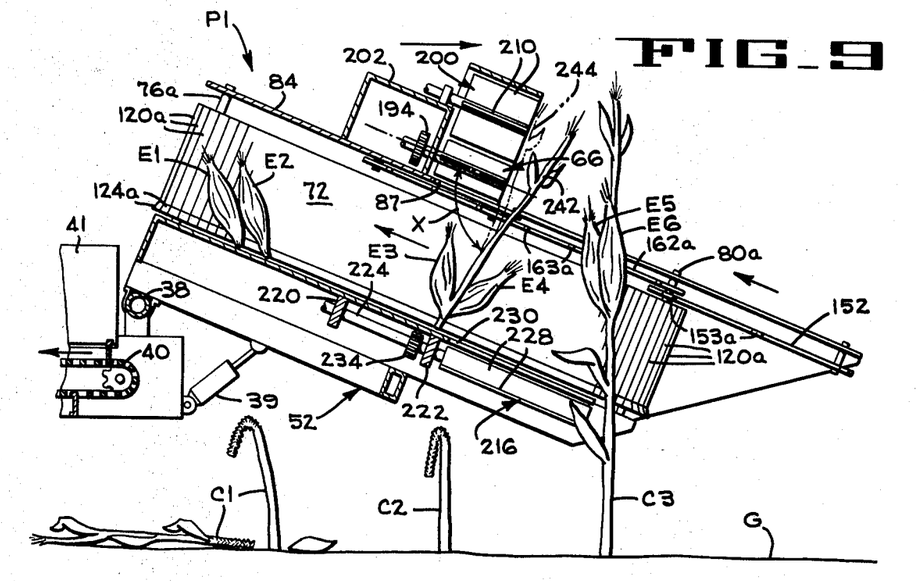

In FIGS. 7–9 the picking head P1 is moving toward a row of cornstalks C1, C2 and C3 in an operative harvesting position as controlled by actuation of the cylinders 39 to elevate the picking heads P1 and P2 from the ground line G. Since the declination of the picking heads is adjustable, the operative position might vary under different conditions, but of course the knife blade rotors 216 and 218 must be below the lowest ears E. FIGS. 7–9 are substantially vertical sections through the picking head P1, but include the near stalk ejector paddle blades 188 and the near knife blade rotor 216.

The first stalk C1 (FIG. 7) and its ears E1 and E2 enter the picking unit P1 in the conventional manner as shown for the stalk C2 and ears E3, E4, and stalk C3 and ears E5, E6. If the stalks are laterally tilted, the pusher lugs 153a (or the similar opposed lugs 153) of the gathering chain 152 will bring the lower portion of the stalk into substantial alignment with the rotors 216 and 218. Further centering of the stalk is effected by the gathering belts 70 and 72 (FIG. 10) since they extend forward of the knife blade rotors 216 and 218, and their confronting ledges 124 and 124a are closely spaced.

The knife blade rotors 216 and 218, revolving at relatively high speed, chop into the stalk and pull it rapidly downward, severing foliage from the stalk and moving the butt or attachment end of the ears toward the stop bar ledges 124a on the moving stop bars 120a. Thus, the ears E1 and E2 are arrested as shown for the ear E in FIGS. 6 and 10. The ear is substantially perpendicular to the rotors because, as shown for the stalk C1 (FIG. 7), the upper portion of the stalk tends to lean forward into a position normal to the knife blade rotors 216 and 218 due to the cutting action of the knives on the rotors.

When an ear is seated on the stop bar ledges 124 and 124a (FIG. 10), its attachment at 240 to the stalk C is next severed by the knives 228 on the rotors 216 and 218, and the ear is conveyed rearwardly by the confronting reaches of the flights of stop bars 120 and 120a as shown for the ears E1 and E2 (FIG. 8). Since the slot 230 is wider than the gap formed by the s top bar ledges, all loose foliage falls into the knife blade rotors to be chopped and ejected onto the ground. Meanwhile, the stalk is chopped and pulled downward onto the ground, and also tends to draw some of the loose foliage through the rotors.

In the event that the stalk C2 (FIG. 9) either breaks or is accidentally severed by the rotors so that a free upper end portion 242 and unharvested ears E3 and E4 are left in the machine, the broken stalk portion is carried rearward by the moving stop bars. Thus the stalk enters the stripper plate slot 87 (FIG. 11) and is guided toward the stalk ejector 66 where the counterrotating paddle blades 188 and 190 are arranged to engage the stalk and force it upward into the blades 210 (FIG. 10) of the stalk deflector 200 so that the stalk is ejected toward the side of the machine. When the stalk is driven upward, the ears E3 and E4 will be arrested by the stripper plate 84 so that the ears and stalk are separated. The severed ears fall back between the moving stop bars and are conveyed rearward with the other harvested ears.

Thus far, the described operation is the same as is disclosed in my Pat. 3,499,272, and is the predominant manner in which the broken stalks are handled. It has been found, however, that the stalk ejecting mechanism 66 (FIG. 10) is subject to an occasional malfunction whereby a broken stalk will escape being gripped between the stalk ejecting paddle blades 188 and 190. As a result, the broken stalk section and any ears it may carry remain between the gathering belts 70 and 72 and are conveyed along with the normally harvested ears. This can not only result in damage to the ears, but might cause structural damage and so interfere with the normal harvesting functions as to necessitate stopping the harvesting machine to remove the blockage.

The cause of the above described malfunction is virtually undetectable when the harvesting machine is in operation because of the abundant foliage masking the moving parts of the picking heads and because of the relatively high speeds at which the harvesting operations are carried out. However, it was discovered that two peculiar circumstances prevent a broken stalk from being gripped by the paddle blades 188 and 190, one being that all of the foliage on the stalk escapes being emmeshed in the stalk ejecting mechanism 66, and the other being that the stalk slides downward in parallelism with and over the end surfaces of the interdigitating paddle blades 188 and 190, as shown in phantom lines at 244 (FIG. 9).

Figures 10, 11:
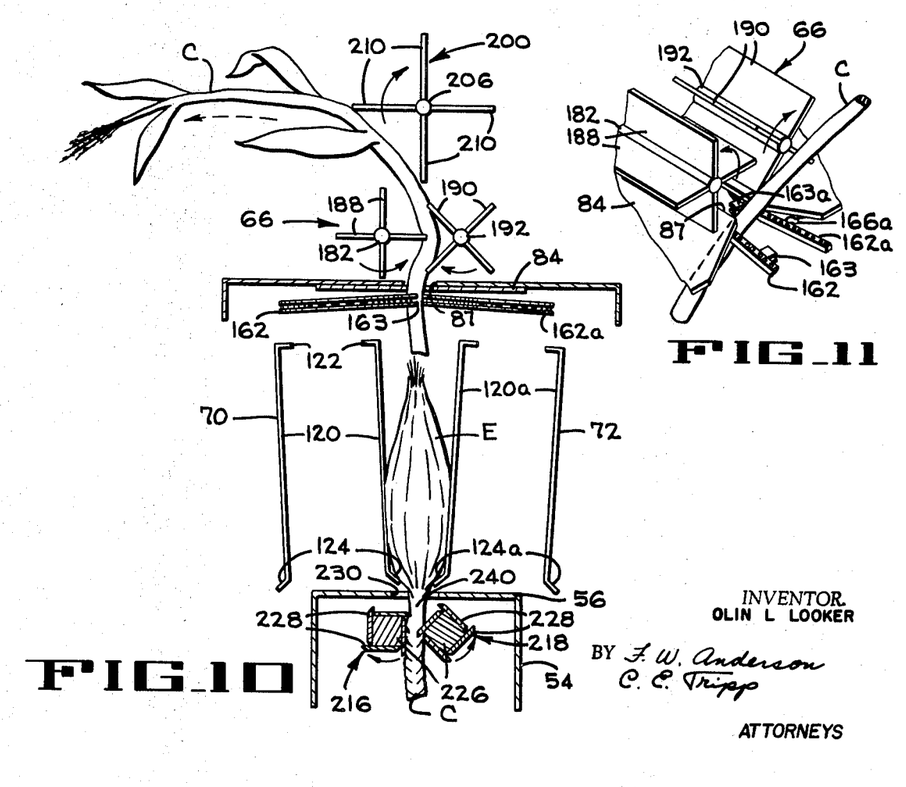
FIG. 10 is a section, similar to FIG. 6, diagrammatically illustrating the ear harvesting and broken stalk ejecting functions.
FIG. 11 is an enlarged fragmentary perspective of the stalk ejecting rotors and stripper plate shown in FIG. 10.

It was ultimately realized that a simple and efficient solution to the problem without revamping the stalk ejector mechanism is to control the attitude of the stalk so that it enters the relatively open nip at the lower confronting sectors of the stalk ejecting paddles. In other words, it is necessary to provide means for limiting the included angle X (FIG. 9) between a plane including the paddle shafts 182 and 192 (FIG. 10) and a plane including the stalk C2, to less than 90 degrees. In this manner only a short section of the stalk at a point near the stripper plate 84 is initially contacted by the paddle blades, as shown in FIG. 11, so that the gripping action proceeds in steps without the end edges of the paddle blades obstructing entry of the stalk, and without relying upon the stalk foliage becoming emmeshed with the paddle blades to initiate the stalk gripping action.

One manner of controlling the entry attitude of the stalks into the stalk ejecting mechanism 66 is to have a different orientation of the axes of the paddles, but this is least practical because of the linear chain runs required for the driving chain for the paddles. The preferred way is by retarding the upper portions of the stalks via the ejector feed chains 162 and 162a, which, as previously mentioned travel rearward slower than the gathering belts 70 and 72. FIG. 9 diagrammatically illustrates the cooperative effect of the ejector feed chain 162a with the gathering belt 72 in tipping the broken upper stalk portion 242 of the stalk C2 for feeding into the broken stalk ejecting mechanism 66.

Fed into the picking unit P1 in the same manner as the stalk C1 (FIGS. 7 and 8), the stalk C2, if it does not break will be drawn down between the knife blade rotors 216 and 218, and ejected onto the ground before it has traversed the length of the rotors. If the stalk section 242 breaks off as illustrated, its lower portion is conveyed rearward by the gathering belts 70 and 72 at about the same speed as the forward speed of the harvesting machine. The upper portion of the stalk, however, is impeded by lugs 163 and 163a on the ejector feed chains 162 and 162a which move rearward at about ⅔ of the forward speed, or less, of the harvesting machine. It is evident, therefore, that the broken stalk section 242 tips forward. By the time the stalk is adjacent the stalk ejecting mechanism 66, the angle X is considerably less than 90 degrees. As a result of this coaction of the gathering belts and the ejector feed chains, the stalk section 242 (FIG. 11) is non-parallel to the end surfaces of the paddle blades 188 and 190, and only a small segment of the stalk is fed between the relatively open, lower nip sectors of the interdigitating paddle blades. In this manner, the end edges of the paddle blades will not block free entry of the stalk. If a stalk happens to be malformed such that its upper portion, even though controlled by the ejector chains is still parallel to the end surfaces of the paddle blades, the adjacent ejector feed chain lugs 162 and 162a overtake the stalk and thus push the stalk into engagement between the paddle blades.

Whatever the forward speed selected for the harvesting machine, the same speed relation exists between the ejector feed chains 162, 162a and the gathering belts 70, 72 due to their common drive source. Therefore, when the hydraulic motor 58 has been adjusted to drive the confronting flights of the gathering belts rearward at the appropriate speed relative to the forward speed of the harvesting machine, all broken stalks will have the same general angularity relative to the stalk ejecting paddle blades and will be positively gripped for ejection. It will be evident that the same optimum broken stalk handling operations are carried out regardless of the angle (elevation) at which the picking heads are locked about their pivot axis 38 to the frame of the harvesting machine.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. In a corn picking head including a frame; gathering means mounted on said frame and having confronting rearwardly moving belt reaches arranged to straddle a growing cornstalk; chopping means beneath said gathering means for gripping, pulling and ejecting the cornstalk downward; ear arresting means preventing downward ejection of the ears with the stalk; a pair of driven ejection rotors mounted above said gathering belts, said ejection rotors being arranged to cooperatively grip the upper end portions of a broken stalk and to eject the broken stalk upwardly from the machine; the improvement comprising ejection feed means mounted directly below said ejection rotors, said ejection feed means having confronting and rearwardly converging reaches for engaging the stalk, and power means driving said ejection feed means to move said reaches rearward at a lineal speed slower than the lineal speed of said gathering means for retarding rearward motion of the upper portion of a stalk as the lower portions are fed by said gathering means to underfeed the stalk to said ejection rotors.

2. Apparatus according to claim 1 wherein said gathering means and said ejection feed means are both driven by said power means.

3. Apparatus according to claim 1 wherein each of said ejection rotors includes a central support shaft and rectangular paddle blades projecting radially from said shaft, the end edges of said paddle blades being in a common plane normal to the support shafts, said paddle blades of the two rotor members being out of phase and interdigitating so as to form a substantially open nip between the confronting paddle blades at the lower confronting sectors of said ejection rotors to facilitate the gripping of a stalk.

4. Apparatus according to claim 3 wherein said ejection feed means extend rearwardly beyond said ejection rotors, and a stripper plate underlying said ejection rotors, said stripper plate defining a forwardly open elongate slot in a vertical plane intermediate said ejection rotors, said slot being arranged to slidably receive the upper portion of a broken cornstalk delivered by said ejection feed means to guide the stalk into said nip and to arrest any ears on said stalk when the stalk is ejected upward by said ejection rotors.

5. In a mobile corn harvesting machine, a corn picking head comprising a frame arranged to straddle a vertical plane including a row of growing cornstalks, a pair of forwardly declining driven gathering belts mounted on said frame for resiliently gripping opposite sides of the lower portions of the cornstalks and moving rearward with the stalks at approximately the same forward speed as the harvesting machine to maintain the lower stalk portions generally upright, a pair of driven ejector feed chains mounted above said gathering belts and having confronting reaches arranged to engage the upper portion of incoming cornstalks, said reaches moving rearward at a speed slower than the speed of said gathering belts, said upper stalk portions thus being pushed in the direction of forward movement of said harvesting machine to incline the upper portion of the cornstalk forward relative to its lower portion, and a pair of counterrotating stalk ejecting rotors straddling said vertical plane above said ejector feed chains, said rotors being provided with interdigitating paddle blades having axes of rotation extending in the direction of movement of said gathering belts and leading end edges in a common plane normal to said axes, said forwardly inclined position of the upper stalk portion resulting in an included angle less than 90 degrees between said upper stalk portion and said rotor axes, the stalk thus being gripped by only those paddle blades at the relatively open nip in the lower confronting sectors of said stalk ejecting rotors.

6. A method of handling growing cornstalks in the picking head of a mobile corn harvesting machine wherein chopping rotors engage the lowermost portion of the stalk and pull the stalk downward onto the ground while the ears are retained in the picking head, and wherein driven side by side interdigitating rotors on the picking head laterally grip and upwardly eject stalks which break off above the rotors, comprising the steps of engaging the lower portion of the stalk and conveying the stalk rearward into the machine at a speed approximately the forward ground speed of the vehicle, engaging the upper portion of the stalk and retarding but not stopping its rearward movement into the machine so that the uppermost portion of the stalk inclines forward from its normal upright growing position, and presenting the inclined uppermost position of the stalk to the lower nip of the ejection rotors so that only a small segment of the stalk is initially contacted by the rotors.

References Cited
UNITED STATES PATENTS

| | | | |
|---|---|---|---|
| 2,957,293 | 10/1960 | Roscoe et al. | 86—18 |
| 2,974,466 | 3/1961 | Hyman | 56—18 |

ROBERT PESHOCK, Primary Examiner

PO-1050
(5/69)

UNITED STATES PATENT OFFICE
CERTIFICATE OF CORRECTION

Patent No. 3,535,857        Dated October 27, 1970

Inventor(s) OLIN L. LOOKER

It is certified that error appears in the above-identified patent and that said Letters Patent are hereby corrected as shown below:

Column 1, line 27 - change "3,399,272" to -- 3,499,272 --.
Column 6, line 26 - change "the" to -- and --. Column 7, line 5 - change " s top" to -- stop --.

Signed and sealed this 11th day of January 1972.

(SEAL)
Attest:

EDWARD M. FLETCHER, JR.
Attesting Officer

ROBERT GOTTSCHALK
Acting Commissioner of Patents